United States Patent
Walsh

(10) Patent No.: US 8,136,877 B2
(45) Date of Patent: Mar. 20, 2012

(54) BICYCLE SEAT HEIGHT ADJUSTING ASSEMBLY

(75) Inventor: Austin A. Walsh, West Newbury, MA (US)

(73) Assignee: Austin A. Walsh, West Newbury, MA (US)

( * ) Notice: Subject to any disclaimer, the term of this patent is extended or adjusted under 35 U.S.C. 154(b) by 142 days.

(21) Appl. No.: 12/699,203

(22) Filed: Feb. 3, 2010

(65) Prior Publication Data

US 2011/0187166 A1      Aug. 4, 2011

(51) Int. Cl.
   *B62J 1/00*      (2006.01)
   *B62J 1/02*      (2006.01)
   *B62J 1/08*      (2006.01)
   *B62K 19/36*     (2006.01)

(52) U.S. Cl. .................................... 297/215.13
(58) Field of Classification Search .............. 297/215.13
   See application file for complete search history.

(56) References Cited

U.S. PATENT DOCUMENTS

| | | | | |
|---|---|---|---|---|
| 3,861,740 A | * | 1/1975 | Tajima et al. | 297/215.13 |
| 4,789,176 A | * | 12/1988 | Carroll | 297/215.13 X |
| 5,236,169 A | * | 8/1993 | Johnsen | 297/209 X |
| 5,713,555 A | * | 2/1998 | Zurfluh et al. | 248/599 |
| 5,826,935 A | * | 10/1998 | DeFreitas | 297/215.13 |
| 5,829,733 A | * | 11/1998 | Becker | 297/199 X |
| 5,899,479 A | * | 5/1999 | Schroder | 297/215.13 X |
| 6,220,581 B1 | * | 4/2001 | Mueller | 267/64.11 |
| 7,025,367 B2 | * | 4/2006 | McKinnon | 280/288.4 |
| 7,083,180 B2 | * | 8/2006 | Turner | 280/287 |
| 7,306,206 B2 | * | 12/2007 | Turner | 267/64.12 |
| 7,673,936 B2 | * | 3/2010 | Hsu | 297/215.13 |

* cited by examiner

*Primary Examiner* — Rodney B White

(57) ABSTRACT

A bicycle seat height adjusting assembly comprises of a seat post that axially slides into an insert sleeve that fits into a bicycle frame in the place of a conventional seat post. The front of the seat post has a plurality of evenly spaced holes sized to receive a locking pin. The locking pin with supplemental spring is positioned within a generally cylindrical protrusion that extends out from the top section of the insert sleeve. A main air spring is positioned within the seat post to keep the main air spring free from dirt interference, allow the post to fully rise and lower, and enable the use of a maximum height pre-adjustment system. The locking pin connects to a cable that extends out to an actuation lever that is positioned on the handlebars. The opening between the main air springs two chambers is sized to damped the airflow and keep the seat post from rising up too fast. The counter rotational system for the seat post is formed mainly in the insert sleeve to maintain a strong and conventional looking seat post.

20 Claims, 4 Drawing Sheets

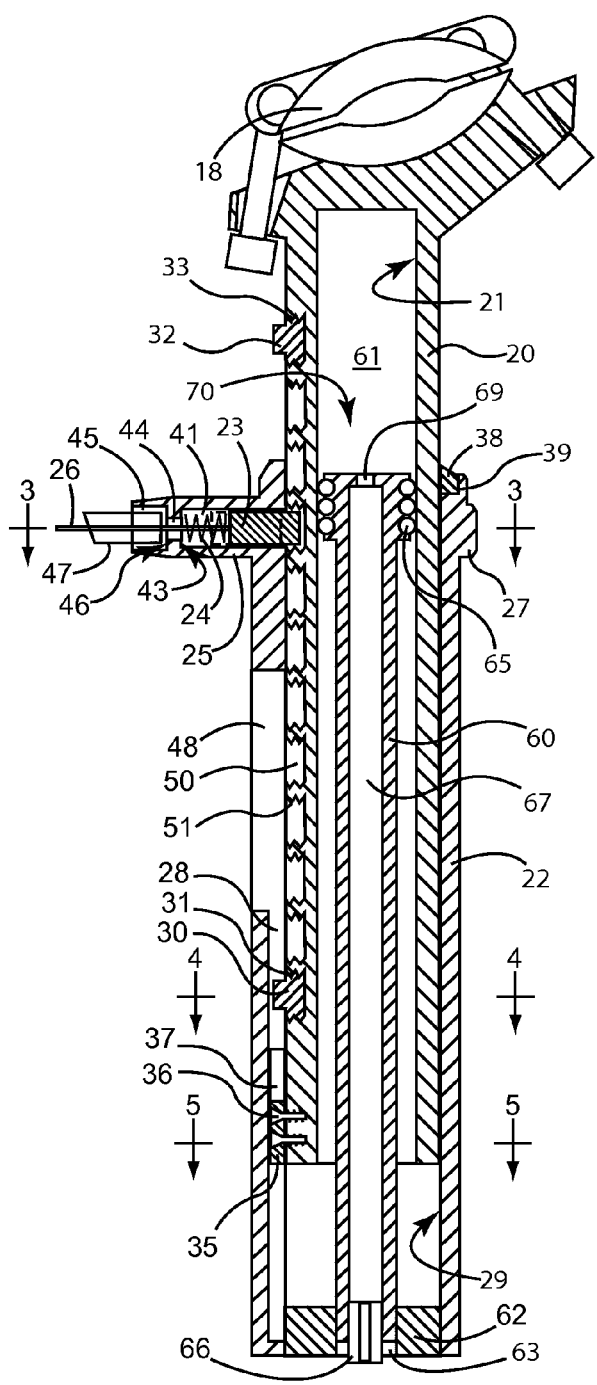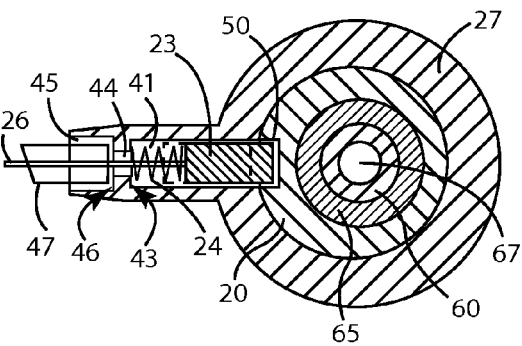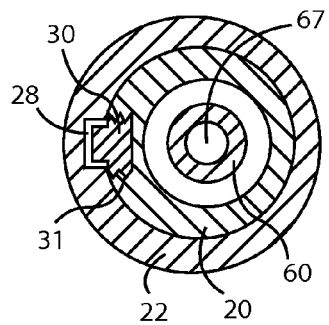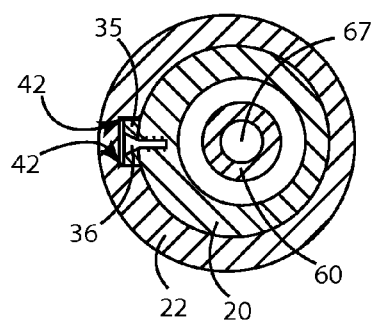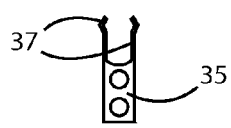

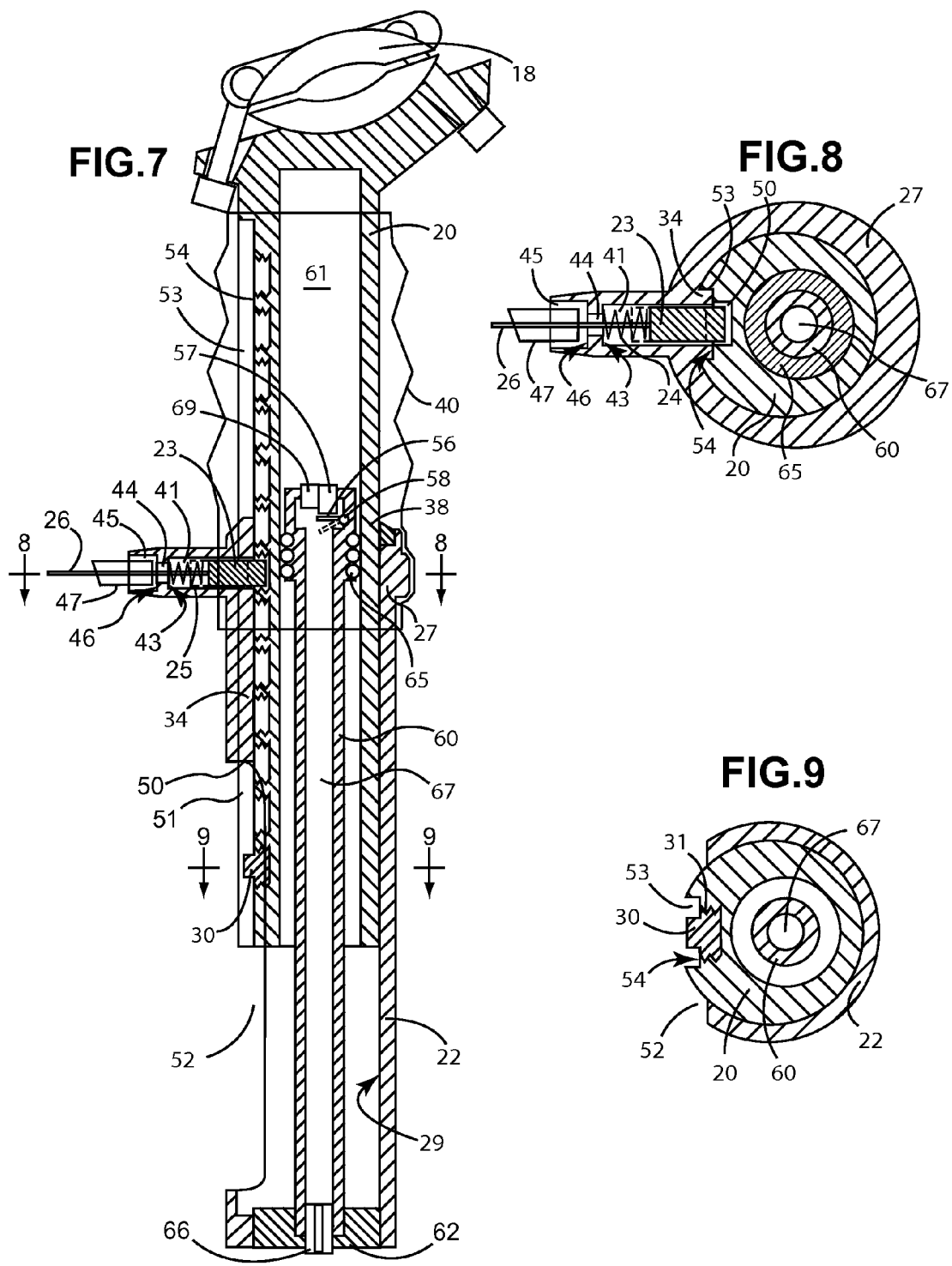

BICYCLE SEAT HEIGHT ADJUSTING ASSEMBLY

BACKGROUND OF THE INVENTION

This invention relates generally to a seat post that can be fully raised or lowered, particularly on a mountain bicycle while the cycle is in motion.

While a bicycle seat is positioned higher, the seated cyclist is able to exert a greater amount of force on the pedals. Yet, the bicycle is vastly more maneuverable while the seat is down and out of the way. While riding on trails that are steep and challengingly bumpy, this lower seat position gives the cyclist a lower center of gravity, to avoid being thrown off the bike. An adjusting seat post assembly should therefore have the capacity to be fully adjusting.

For the cyclist there is an exact seat height that yields the greatest amount of propulsion from the bicycle. A system that immediately positions the seat post into this personalized, exact maximum height will reduce the time and effort that would otherwise be spent making readjustments while riding the bicycle.

A remote lever that is positioned on the handlebars is required for keeping the cyclist safely attached to the bicycle. A seat post adjusting system that requires the cyclist to remove one hand from the handlebars while riding over bumpy terrain would possibly cause the cyclist to loose control of the bicycle.

A bicycle seat post needs to be strong and lightweight relative to the added performance that a seat post or any other bicycle component may bring to the bicycle. In the field of height adjusting seat posts, the seat post assembly should also be as light and strong as possible.

Bicycling on trails of dirt and mud, an adjusting seat post assembly must be as dirt poof as possible to maintain the products reliability.

There are a number of height adjusting seat posts designs that provide an upwardly urging spring mechanism and a post locking means. Yet, most of these designs are not capable of full adjustment and are limited in their range of operation. Use of a main air spring should also decrease weight and increase strength from having a generally tubular-type structure.

An air sprung adjusting seat post should also have a lightweight air dampening system to keep the seat post from rising up too fast. Yet, the air sprung posts presented so far, all do not provide a fully capable, adjusting seat post.

Zurfluh, U.S. Pat. No. 5,713,555, Hsu, U.S. Pat. App. No. 2009/0108642, Turner, U.S. Pat. No. 7,083,180 and McAndrews, U.S. Pat. App. No. 2009/0324327 all present main air spring seat post designs. Yet, they all simply position the seat post within the main insert sleeve to form a main air spring. These previous designs are extremely sensitive to dirt, as their air seals can be broken by any dirt that gets onto the seat post and is then lowered into the main insert sleeve. All these other systems, also do not include a lightweight air dampening system or have the capacity to access a personally adjustable maximum height set system for achieving a full span of height adjustment.

OBJECTS AND ADVANTAGES

An object and unique advantage of the present invention is a seat post assembly that has a main inverted air spring that is positioned within the seat post to keep the air spring sealed and free from being impeded by dirt, which there is much of, often when mountain biking.

Another object and unique advantage of the present invention is a seat post assembly that incorporates a full span air spring design that is able to maintain a very even spring rate while fully rising and fully lowering. This inverted, two chamber air spring design further enables the use of a lightweight air dampening system that keeps the seat post from rising up too fast.

Another object and advantage of the present invention is a seat post assembly that utilizes a main air spring to provide a strong and lightweight adjusting seat post due to its high strength, tubular type structure.

Another object and advantage of the present invention is a seat post assembly that has a full span and range of locking positions, from a fully lowered position for maximum control, a multitude of middle positions for varying degrees of terrain challenge and a maximum seat height position that provides the most power and efficiency from the bicycle.

Another object and advantage of the present invention is a seat post assembly that incorporates a remote actuation lever that is positioned on the handlebars and therefore keeps the cyclist safely attached to the bicycle.

Another object and advantage of the present invention is a seat post assembly that has a capacity to personally adjust the maximum seat height that the seat post can rise to. Leg length and general comfort are the main factors when an individual is determining the maximum height that they want their seat to go, as the maximum height that the seat post is set at is different for almost everyone. By placing the air spring device within the seat post, this air spring devise also allows for a unique ability to access the outside of the seat post, where a maximum height adjustment devise is therefore able to be used and adjusted.

BRIEF DESCRIPTION OF THE DRAWINGS

FIG. 2 is an enlarged sectioned side view of the seat post assembly illustrated in FIG. 1;

FIG. 3 is an enlarged horizontal cross-sectional view of FIG. 2 taken on line 3-3;

FIG. 4 is an enlarged horizontal cross-sectional view of FIG. 2 taken on line 4-4;

FIG. 5 is an enlarged horizontal cross-sectional view of FIG. 2 taken on line 5-5;

FIG. 6 is a front view of the seat post counter rotational device;

FIG. 7 is a view similar to FIG. 2 of another embodiment of the invention;

FIG. 8 is an enlarged horizontal cross-sectional view of FIG. 7 taken on line 8-8;

FIG. 9 is an enlarged horizontal cross-sectional view of FIG. 7 taken on line 9-9;

DESCRIPTION OF THE PREFERRED EMBODIMENTS

Figure 1:
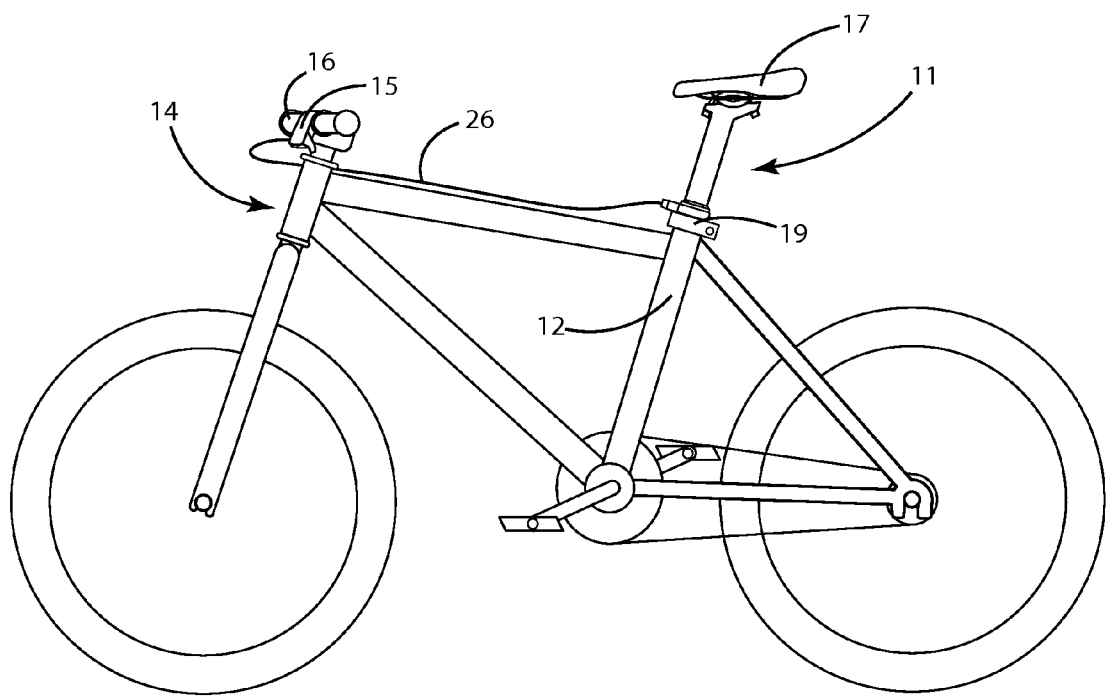
FIG. 1 is a side elevational view of a bicycle equipped with a seat position adjusting assembly according to one embodiment of this invention.

Referring now to the embodiment of the invention shown in FIGS. 1 through 6 thereof, a new seat height positioning assembly generally designated by the reference number 11 is shown in FIG. 1 inserted into the seat tube 12 of a bicycle frame 14. The adjustable seat height assembly 11 generally comprises a seat post 20 and an insert sleeve 22 that is mostly tubular in configuration. Extending outwardly from the upper portion of the insert sleeve 22 is a generally cylindrical protrusion 25 that contains a seat post locking pin 23 and supplemental spring 24. The locking pin 23 is connected by a cable 26 to an actuating lever 15. The actuating lever 15 is positioned on the bicycle handlebar 16. The seat post positioning assembly 11 also comprises a main air spring 70, a maximum height set screw 30, and a counter rotational boss 35. The seat 17 is clamped to the top portion of the seat post 20 through any conventional clamping method 18.

The insert sleeve 22 retrofits into a bicycle frame seat tube 12 in the place of a traditional seat post. The insert sleeve 22 has a slight collar 27 at the upper portion that acts to limit the sleeve 22 from sliding entirely into the bicycle frame seat tube 12. A post clamp 19 is engageable around the seat tube 12 of the bicycle frame 14 for fixedly securing the insert sleeve 22 with respect to the seat tube 12.

The seat post 20 is adjustable up and down, being telescopically slidable within the insert sleeve 22. The seat post 20 is tubular in configuration as defined by a first inner wall 21. A second tubular structure 60 is positioned mainly within the first inner wall 21 of the seat post 20. A support disk 62 has a central opening 63 that fits onto the bottom of the second tubular structure 60. The support disk 62 is attached to the sleeve inner wall 29 of the insert sleeve 22 within the lowest section of the insert sleeve 22. An air valve 66 is positioned within the bottom section of the second tubular structure 60. The air valve 66 extends below the support disk 62, where it is capable of receiving pressurized air from an air pump type device. A perimeter air seal 65 is positioned around the top perimeter of the second tubular structure 60. The perimeter air seal 65 creates a seat post 20 first air chamber 61 that is positioned above the perimeter air seal 65 and also creates a second air chamber 67 that is the inner area of the second tubular structure 60. Air that is pumped into the second air chamber 67, through the air valve 66, will travel out the top end of the second air chamber 67 and be further contained within the first air chamber 61 of the seat post 20. As the air pressure increases within the first air chamber 61 and the second air chamber 67, the pressurized air pushes up on the top surface of the first air chamber 61, to therefore form a main air spring 70 that urges the seat post 20 to rise.

An air damper opening 69 is formed at the top of the second tubular structure. The air damper opening 69 is sized generally small enough to slow the air flow between the first air chamber 61 and the second air chamber 67. The air damper opening 69 will restrain the seat post 20 from rising too fast.

A wiper seal 38 is positioned around the sides and back of the seat post 20. The wiper seal 38 fits into a wiper groove 39 that is formed around the sleeve inner wall 29 of the top section of the insert sleeve 22. The wiper seal 38 will shed mud off the seat post 20 and keep mud from entering into the insert sleeve 22.

A counter rotational boss 35 is used to contain the seat post 20 from rotation. An inner channel 28 defined by spaced parallel walls 42,42, is formed longitudinally along the sleeve inner wall 29 of the insert sleeve 22. The inner channel 28 is formed in the lower three quarters of the insert sleeve 22. The counter rotational boss 35 is attached to the bottom front side of the seat post 20 by the use of two screws 36,36 that tighten into the seat post 20. The counter rotational boss 35 slides within the inner channel 28. The counter rotational boss 35 is then contained against rotation by the parallel walls 42,42 of the inner channel 28. Two stabilizing leaf springs 37,37 extend up from the counter rotational boss 35. The two stabilizing leaf springs 37,37 continuously press against the parallel walls 42,42 of the inner channel 28 to stabilize the seat post 20 and firm up any amount of play between the counter rotational boss 35 and the parallel walls 42,42 of the inner channel 28. An access opening 48 is formed through the insert sleeve 22 at the top section of the inner channel 28. The access opening 48 is used firstly to gain access to the seat post 20 so that the counter rotational boss 35 can be attached.

The maximum height set screw 30 is used to set the seat post 20 at a maximum seat height limitation. Formed longitudinally along the front of the seat post 20 is a rack of post holes 50. The post holes 50 have threads 51 to enable the maximum height set screw 30 to be tightened within one of the post holes 50. The maximum height set screw 30 also uses the access opening 48 to gain access to the post holes 50. The maximum height set screw 30 has screw threads 31 formed in the portion that is positioned within one of the post holes 50. A portion of the maximum height set screw 30 extends into the area of the inner channel 28 after the maximum height set screw 30 is fully tightened within one of the post holes 50. The maximum height set screw 30 stops the upward motion of the seat post 20 upon the outermost portion of the maximum height set screw 30 being limited by the top surface of the inner channel 28.

The minimum height set screw 32 is used to set the seat post 20 at a minimum seat height limitation. The minimum height set screw 32 also has screw threads 33 formed in the portion of the minimum height set screw 32 that is positioned within one of the post holes 50. The minimum height set screw 32 is tightened within one of the exposed upper post holes 50. As the seat post 20 is lowered, the minimum height set screw 32 will stop the seat post 20 from lowering, upon engaging the top surface of the insert sleeve 22.

The locking pin 23 and supplemental spring 24 are slidably receivable within an inwardly open bore 41 that is formed within the generally cylindrical protrusion 25 of the insert sleeve 22. The supplemental spring 24 is positioned between the end platform 43 of the inwardly open bore 41 and the locking pin 23. The inwardly open bore 41 is set in alignment with the receiving post holes 50. The locking pin 23 is forced into one of the post holes 50 by the supplemental spring 24 to lock the seat post 20 at a given height. A second bore 44 extends through the generally cylindrical protrusion 25. The second bore 44 is sized to allow the cable 26 to pass through. A third bore 45 is formed in the outermost section of the generally cylindrical protrusion 25. The third bore 45 is outwardly open with an inner end platform wall 46. The third bore 45 is sized to have a portion of the cable housing 47 positioned within it.

When the cyclist pulls the actuation lever 15, the locking pin 23 is pulled into its open position shown in broken lines in FIG. 3. The locking pin 23 is therefore disengaged from one of the post holes 50 and the seat post 20 is urged upward by the force of the main air spring 70. After adjusting the height of the seat post 20 with the cyclists buttocks the cyclist releases the actuation lever 15, allowing the supplemental spring 24 to return the locking pin 23 to the locked position. Shown in FIG. 3 is the locking pin 23 positioned into one of the seat post 20 locking holes 50.

FIG. 7,8,9 is the same as the embodiment in FIG. 1-6, with a few exceptions. The counter rotational boss 35 is replaced by an insert sleeve boss 34. The insert sleeve boss 34 is positioned along the sleeve inner wall 29 of the insert sleeve 22. The inner channel 28 is replaced by a longitudinal slot 52. The longitudinal slot 52 is formed through the insert sleeve 22. The insert sleeve boss 34 is positioned directly above the longitudinal slot 52. A main groove 53 is formed longitudinally along the front of the seat post 20. The post holes 50 are formed respectively along the back wall 54 of the main groove 53. The insert sleeve boss 34 extends into the main groove 53 to thereby limit the seat post 20 against rotation. The maximum height set screw 30, that is positioned within one of the lower post holes 50, stops the upward motion of the seat post 20 upon engaging the insert sleeve boss 34. The minimum height set screw 32 is replaced by the top surface 55 of the main groove 53. The top surface of the main groove 53 therefore stops the seat post 20 from lowering, upon engaging the top surface of the insert sleeve boss 34. A boot type cover 40 is shown in FIG. 7 being attached around the top section of the seat post 20 and secondly attached around the top section of the insert sleeve 22 to completely seal out dirt and mud from getting into the insert sleeve 22.

An air gate 56 is shown in FIG. 7, that is used in addition to the air damper opening 69, to let air pass from the first air chamber 61 to the second air chamber 67 without dampening the linear movement of the seat post 20. The air gate opening 57 is positioned through the top surface of the second tubular structure 60. The air gate 56 is made of a rubber like material that forms a flexible hinge 58 that pivots a cover seal 59 for the air gate opening 57. The air gate 56 is shown in FIG. 7 in a generally closed position. The air gate 56 is shown in its open position in broken lines. The air gate 56 is opened by the downward movement of air that travels from the first air chamber 61 and passes through the air gate opening 57 to go into the second air chamber 67. The air gate 56 is opened while the seat post 20 is being lowered and closes as the seat post 20 rises.

Figure 10:
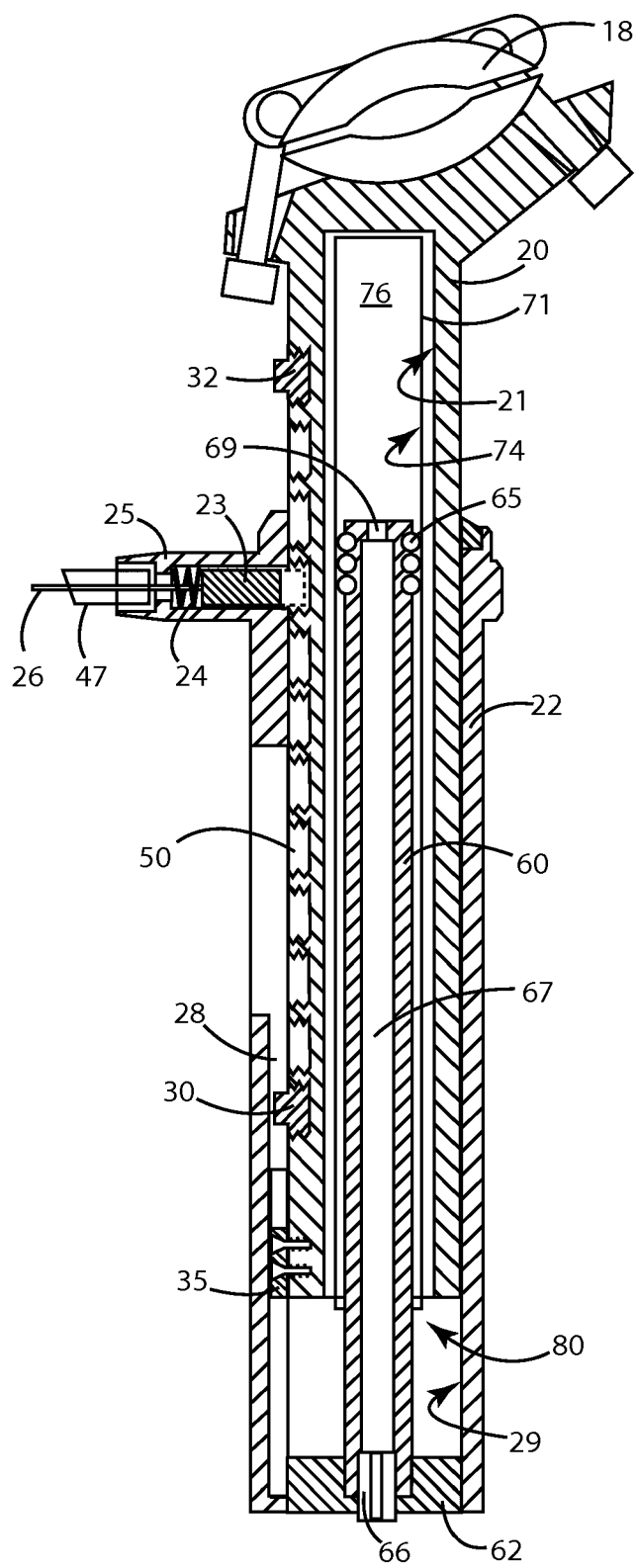
FIG. 10 is a view similar to FIG. 2 of another embodiment of the invention.

FIG. 10 is the same as the embodiment in FIG. 1-6, with a few exceptions. A third tubular structure 71 that has a closed top end and an open bottom end is positioned within the first inner walls 21 of the seat post 20. The second tubular structure 60 is positioned within the third tubular structure 71. The perimeter air seal 65 positioned around the second tubular structure 60 forms an air tight seal between the third inner wall 74 of the third tubular structure 71 and the perimeter air seal 65 to form a third air chamber 76 in the place of the first air chamber 61.

The pressurized air within the third air chamber 76 also flows into the second air chamber 67 of the second tubular structure 60 to form a removable air spring assembly 80.

The locking pin 23 in FIG. 10 is shown in the unlocked position. The locking pin 23 is shown in the locked position in broken lines.

What is claimed is:

1. A bicycle seat height adjusting assembly comprising:
an insert sleeve sized to be slidably receivable within a bicycle's seat tube, said insert sleeve having a top portion, a middle portion and a lower portion, said top portion further having a to surface section; said insert sleeve having a front longitudinal side, said insert sleeve being substantially tubular in shape therein having an inner wall and an outer wall;
an axially slidable seat post positionable to different heights within said insert sleeve;
said seat post having a top portion, a middle portion and a lower portion, said seat post having a front longitudinal side; said seat post is adapted to support a bicycle seat at said to portion of said seat post; said seat post being substantially tubular in shape therein and having an inner wall and an outer wall; said seat post having a substantially closed top end and an open bottom end;
means for preventing said seat post from rotating relative to said insert sleeve;
a second tubular structure having a substantially open top end and a substantially closed lower section, said second tubular structure having an outer wall and an inner wall; said second tubular structure is longitudinally positioned substantially within said inner wall that defines said seat post, said second tubular structure being attached to said insert sleeve at said lower section of said second tubular structure;
an air seal positioned around said outer wall of said top end of said second tubular structure, wherein air is not able to pass between said inner wall of said tubular seat post and said air seal to form a first air chamber within said seat post and a second air chamber within said second tubular structure;
an air valve communicating with said first air chamber of said seat post and said second air chamber of said second tubular structure, said air valve containing means for controlling the supply of pressurized air within said first air chamber of said seat post and said second air chamber of said second tubular structure, said substantially open top end of said second tubular structure allowing the flow of said pressurized air from said second air chamber to said first air chamber, thereby creating a main air spring urging said seat post to thereby move upwardly relative to said second tubular structure;
a plurality of post holes formed longitudinally along the front side of said seat post, each of said post holes being outwardly open and having a post hole platform wall at each of said post hole's inner end;
a locking means substantially contained within the top portion of said insert sleeve,
said locking means being sized and aligned to engage said post holes and operably associated with said seat post to be adjusted by disengaging said locking device from said post holes whereby said seat post is slidably adjusted into position by an operator between locking positions;
a cable adapted to extend from said locking means to an actuating lever positioned on bicycle handlebars, to retract said locking means;
a maximum height set means, whereby the operator is able to limit the post from rising beyond an exact, personally set, optimum height;
an access opening formed through said insert sleeve, whereby said maximum height set means is accessible to allow for adjustment of said maximum height set means;
a cable housing is substantially positioned around said cable to thereby enable operation of said actuation lever.

2. A bicycle seat height adjusting assembly according to claim 1, wherein said substantially open top end of said second tubular structure is sized to control the speed of air flow from said first air chamber of said seat post to said second air chamber of said second tubular structure as a means of dampening sliding movement of said seat post.

3. A bicycle seat height adjusting assembly according to claim 2, wherein said dampening means is further comprised of an air gate that is positioned and adapted to partially cover said substantially open top end of said second tubular structure, said air gate having said a partially open position and a substantially open position, whereby said air gate is forced into said open position as said pressurized air moves through said substantially open to end of said second tubular structure with air flowing from said first air chamber of said seat post to said second air chamber of said second tubular structure thereby without dampening said air flow.

4. A bicycle seat height adjusting assembly according to claim 1, further comprising a substantially cylindrical protrusion that extends outwardly from a front exterior of said top portion of said insert sleeve, said substantially cylindrical protrusion having an outer portion positioned farthest from said insert sleeve's central axis, said substantially cylindrical protrusion having an inwardly open bore that is formed in radial alignment from said seat post's central axis and aligned with said post holes, said inwardly open bore being open to the inner wall of said insert sleeve and having a first platform wall at said inwardly open bore's outer end, said inwardly open bore having a locking pin with supplemental spring sized to be slidably removable within said inwardly open bore.

5. A bicycle seat height adjusting assembly according to claim 4, further comprising a second bore that extends through the outer portion of said substantially cylindrical protrusion, said second bore being sized to allow said cable to pass through said substantially cylindrical protrusion, said second bore extending in centered alignment with said inwardly open bore.

6. A bicycle seat height adjusting assembly according to claim 5, further comprising a third bore that is set in centered alignment with said inwardly open bore and formed in said outer portion of said substantially cylindrical protrusion, said third bore being sized to allow said cable housing to be slidably removable from said third bore, said third bore having an open outer end and a second platform wall formed at said third bore's inner end, whereby said cable housing can be securely positioned against said second platform wall.

7. A bicycle seat height adjusting assembly according to claim 6, wherein said locking pin is positioned at the end of said cable and said supplemental spring is slidably receivable within said inwardly open bore, said supplemental spring being biased against said first platform wall of said inwardly open bore, urging said locking pin into any one of said post holes to therefore lock said seat post at a given height, wherein the height of the seat is adjusted when said locking pin is disengaged from said seat post and said seat post is placed into position by the buttocks of a cyclist between locked position.

8. A bicycle seat height adjusting assembly according to claim 7, further including an inner channel that is formed longitudinally within said inner wall of said insert sleeve, said inner channel thereby having channel walls that define said inner channel, wherein said inner channel is positioned below and in longitudinal alignment with said locking means, said inner channel having a substantially closed to end that therein forms a to surface of said inner channel.

9. A bicycle seat height adjusting assembly according to claim 8, wherein said post holes are threaded to enable a screw to be removably receivable within said post holes.

10. A bicycle seat height adjusting assembly according to claim 9, wherein said maximum height set means comprises a maximum height set screw that is sized to be removably receivable within any of said post holes, an outer screw portion of said maximum height set screw is positioned within said inner channel to thereby limit upward movement of said seat post upon said outer portion of said maximum height set screw engaging the top surface of said inner channel, whereby the operator is able to limit said seat post from rising beyond an exact, personally set, maximum height.

11. A bicycle seat height adjusting assembly according to claim 10, further containing a minimum height set means that comprises of a minimum height set screw that is sized to be removably receivable within any of said post holes, a portion of said minimum height set screw positioned outside the perimeter of said seat post to limit the downward movement of said seat post upon said minimum height screw engaging a top portion of said insert sleeve, whereby the operator is able to limit said seat post from lowering beyond an exact, personally set height.

12. A bicycle seat height adjusting assembly according to claim 10, wherein said preventing means against rotation for said seat post is provided by said maximum height set screw being fastened within one of said post holes, said outer screw portion of said maximum height set screw being positioned within said channel walls, said maximum height set screw thereby being contained against rotation by said channel walls of said inner channel.

13. A bicycle seat height adjusting assembly according to claim 10, wherein said preventing means against rotation for said seat post comprises a seat post protrusion that is positioned on said outer wall of said lower portion of said seat post and extends into said inner channel, whereby said seat post protrusion is prevented against rotation by said channel walls.

14. A bicycle seat height adjusting assembly according to claim 13, further comprising a spring material positioned around said seat post protrusion that is biased to press outwardly against said channel walls that define said inner channel to thereby further limit rotational movements of said seat post.

15. A bicycle seat height adjusting assembly according to claim 7, wherein said means for preventing said seat post from rotating relative to said insert sleeve comprises at least one longitudinal groove formed into said outer wall of said seat post and at least one insert sleeve boss formed on said inner wall of said insert sleeve, said insert sleeve boss extending into said at least one longitudinal groove, said seat post further having means for limiting, rotational movements of said seat post, wherein said supplemental spring urges said locking in to press against said post hole platform wall of one of said post holes.

16. A bicycle seat height adjusting assembly according to claim 15, wherein said maximum height set means comprises a maximum height set screw that is sized to be removably receivable within any of said post holes, a portion of said maximum height set screw is positioned below said sleeve boss to thereby limit the upward movement of said seat post upon said maximum height set screw engaging the bottom surface of said sleeve boss, whereby the operator is able to limit said seat post from rising beyond an exact, personally set, maximum height.

17. A bicycle seat height adjusting assembly according to claim 1, further comprising a wiper seal positioned within said top surface section of said insert sleeve unit and further positioned around said seat post as means of wiping off dirt from said seat post as said seat post slides downwardly.

18. A bicycle seat height adjusting assembly according to claim 1, further comprising a boot type cover with a top end and a bottom end, said bottom end of said boot type cover attaches around said top portion of said insert sleeve and secondly, said top end of said boot type cover attaches around said top portion of said seat post.

19. A bicycle seat height adjusting assembly according to claim 1, further including a third tubular structure having a closed top end and an open bottom end that is positioned within said inner wall of said tubular seat post, said second tubular structure being positioned within said third tubular structure and forming a third air chamber in the place of said first air chamber, whereby said main air spring becomes a removable air spring assembly from said seat post.

20. A bicycle seat height adjusting assembly according to claim 1, further comprising an outer collar section formed substantially around said outer wall of the top portion of said insert sleeve to limit the degree to which said insert sleeve will insert into said bicycle seat tube.

* * * * *